(12) United States Patent
Watanabe et al.

(10) Patent No.: US 7,847,966 B2
(45) Date of Patent: Dec. 7, 2010

(54) INFORMATION PROCESSING SYSTEM, PRINTING DEVICE AND CONTENT ACCESS SYSTEM

(75) Inventors: Satoshi Watanabe, Kasugai (JP); Kazuma Aoki, Kasugai (JP); Masashi Suzuki, Nagoya (JP); Kiyotaka Ohara, Nagoya (JP); Makoto Matsuda, North Brunswick, NJ (US)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1077 days.

(21) Appl. No.: 11/586,582

(22) Filed: Oct. 26, 2006

(65) Prior Publication Data

US 2007/0127067 A1   Jun. 7, 2007

(30) Foreign Application Priority Data

Oct. 31, 2005   (JP) .............................. 2005-317053

(51) Int. Cl.
*G06F 15/00* (2006.01)
*G06F 17/00* (2006.01)

(52) U.S. Cl. ..................................... 358/1.15; 715/205
(58) Field of Classification Search ................ 358/1.15, 358/1.16, 1.13, 1.14, 1.18, 473, 474, 269; 709/203, 207, 219, 227; 705/14.41, 14.56, 705/14.6; 715/205, 227, 234
See application file for complete search history.

(56) References Cited

U.S. PATENT DOCUMENTS 5,870,767 A   2/1999   Kraft, IV

2002/0112000 A1*   8/2002   Itoh .......................... 709/203
2003/0016387 A1*   1/2003   Takagi et al. ............... 358/1.15
2004/0064790 A1   4/2004   Aoki et al.
2005/0171846 A1   8/2005   Moroo

FOREIGN PATENT DOCUMENTS

| JP | A 10-162030 | 6/1998 |
| JP | A 11-203381 | 7/1999 |
| JP | A 2002-111909 | 4/2002 |
| JP | A 2002-175160 | 6/2002 |
| JP | A 2002-182865 | 6/2002 |
| JP | A 2002-222075 | 8/2002 |
| JP | A 2004-120683 | 4/2004 |
| JP | A 2005-050195 | 2/2005 |
| JP | A 2005-287953 | 10/2005 |
| WO | WO 2004/066176 A1 | 8/2004 |

* cited by examiner

*Primary Examiner*—Saeid Ebrahimi Dehkordy
(74) *Attorney, Agent, or Firm*—Oliff & Berridge, PLC (57) ABSTRACT

There is provided an information processing system, which comprises a printing unit, a link information print control unit configured such that when first contents which has a first address and contains an object to which a second address is assigned as a link target address are printed, it causes the printing unit to print link information indicating that the first address is a link source address and the second address is the link target address, a link information obtaining unit configured to obtain the link information printed by the printing unit, a second content access unit configured to access second contents to which the second address is assigned in accordance with the link information, and a link source address notification unit configured to notify the link target address of information on the first address in response to execution of access by the second content access unit.

18 Claims, 8 Drawing Sheets

| LINK SOURCE URL | LINK TARGET URL | OBJECT URL |
|---|---|---|
| http://aaa.aaa.aaa/ | http://bbb.bbb.bbb/ | http://bbb.bbb.bbb/bbb |
| http://ccc.ccc.ccc/ | http://ddd.ddd.ddd/ | http://ddd.ddd.ddd/ddd |
| http://eee.eee.eee/ | http://fff.fff.fff/ | http://fff.fff.fff/fff |
| | | |
| | | |
| http://yyy.yyy.yyy/ | http://zzz.zzz.zzz/ | http://zzz.zzz.zzz/zzz |

INFORMATION PROCESSING SYSTEM, PRINTING DEVICE AND CONTENT ACCESS SYSTEM

CROSS-REFERENCE TO RELATED APPLICATION

This application claims priority under 35 U.S.C. §119 from Japanese Patent Application No. 2005-317053, filed on Oct. 31, 2005. The entire subject matter of the application is incorporated herein by reference.

BACKGROUND

1. Technical Field

Aspects of the present invention relate to an information processing system configured to access contents on a network and to print the contents.

2. Related Art

A system configured such that when contents (contents #1) provided as a web page are printed, information on a link target represented by a hyper-link contained in the content #1 is stored, and contents (contents #2) represented by the information on the link target are obtained from the link target when access to the contents #2 in accordance with the information on the link target is designated by a user to print the contents #2. An example of such a system is disclosed in Japanese Patent Provisional Publication No. 2002-182865 (hereafter, referred to as JP2002-182865A).

An affiliate system for advertisement on the Internet has been proposed. In the affiliate system, a banner advertisement to which a link to contents #2 (an advertisement web page) is assigned is contained in contents #1 (i.e., a web page on the Internet). When a user who browsed the contents #1 through a browser running on a user's device clicks the banner advertisement on the contents #1 and browses the contents #2, information indicating that a link source is the contents #1 is transmitted to a server of the contents #2, and a point of a provider of the contents #1 (i.e., a link source) is incremented in the server.

SUMMARY

Aspects of the present invention are advantageous in that at least a system, capable of notifying a server providing contents #2 (which is a link target from contents #1) of information indicating that a link source is the contents #1 when accessing the contents #2 and capable of printing the contents #1 while adding the information to be notified to the server, is provided.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided an information processing system, which comprises a printing unit that executes a print operation, a link information print control unit configured such that when first contents which has a first address on a network and contains an object to which a second address is assigned as a link target address are printed through the printing unit, the link information print control unit causes the printing unit to print link information containing information indicating that the first address is a link source address and the second address is the link target address, a link information obtaining unit configured to obtain the link information printed by the printing unit under control of the link information print control unit, a second content access unit configured to access second contents to which the second address contained in the link information is assigned in accordance with the link information obtained by the link information obtaining unit, and a link source address notification unit configured to notify the link target address of information on the first address contained in the link information as the link source address in response to execution of access by the second content access unit.

With this configuration, it is possible to print the link information representing the link source address and the link target address when the first contents containing the object to which the link to the second contents is assigned. Therefore, it is possible to easily access the second contents of the ink target address and to notify a provider of the second contents of information on the link source address. It is possible to retain an affiliate system even if access to the second contents is executed in accordance with the printed first contents.

The access target to which the information is notified by the link source address notification unit may be a provider of the second contents or a counting server managing the access number. The counting server may be configured to manage the access number for each of providers of the second contents, and to notify the link source address of the provider of the second contents on at established time intervals (e.g., every month).

The timing of notification to the access target may be the timing when the access to the second contents is executed or the timing after finishing the access to the second contents. An access history may be stored so that the notification is executed after a lapse of a predetermined time (e.g., one day).

The units of the information processing system may be attained by a computer and software causing the computer to function as the units. A part of or all of the units of the information processing system may be formed by a dedicated hardware different from a general-purpose computer.

The units of the information processing system may be incorporated into a single device or may be distributed over a plurality of devices communicatably connected to each other through a network.

In at least one aspect, the information processing system further comprises a reading unit configured to be capable of reading an image from an original. In this case, the link information print control unit causes the printing unit to print the link information such that the reading unit is able to read and recognize the link information, and the link information obtaining unit obtains the link information from an image read by the reading unit.

According to the information processing system configured as above, when the first contents containing the object to which a link to the second contents is assigned are printed, the link information representing the link source address and the link target address is printed such that the printed link information can be read by the reading unit. Therefore, by reading the link information through the reading unit, it is possible to easily access the second contents of the link target address and to notify the provider of the second contents of information on the link source address.

It is understood that various print styles may be employed to print the link information to enable a reading device to read the link information. For example, a one-dimensional or two-dimensional code symbol may be used to represent the link information. More specifically, a one-dimensional barcode symbol such as a JAN code standardized in JIS (Japanese Industrial Standards) X 0501 or a two-dimensional code symbol such as a QR Code® standardized in JIS X 0510 may be used to represent the link information. If the reading unit capable of recognizing text is used, the link information may be represented by text.

In at least one aspect, the information processing system further comprises a link information storage control unit configured to store the link information in a storage unit if an object to which the second address is assigned as the link target address is contained in the first contents at an occasion of printing the first contents to which the first address is assigned through the printing unit. In this case, the link information obtaining unit obtains the link information stored in the storage unit.

According to the information processing system configured as above, when the first contents containing the object to which a link to the second contents is assigned are printed, the link information is stored in the storage unit. Therefore, it is possible to easily access the second contents corresponding to the link target address contained in the link information and to notify the provider of the second contents of information on the link source address. It is also possible to specify the link target address and the link source address by printing an ID (identification) formed by text as the link information and allowing the user to input an ID to the information processing system through an operation panel. It is possible to easily access the second contents without reading the link information from a printing medium while notifying the provider of the second contents of information on the link source address.

In at least one aspect, the information processing system further comprises a link information print instruction input unit configured to allow a user to input an instruction indicating whether to print the link information. In this case, the link information print control unit causes the printing unit to print the link information if the instruction to print the link information is inputted through the link information print instruction input unit.

According to the information processing system configured as above, the user who wants to print the link information is able to input an instruction to print the link information so as to print the link information. On the other hand, the user who does not want to print the link information is able to input an instruction not to print the link information so as not to print the link information.

In at least one aspect, the information processing system further comprises a link information display control unit configured to display a display target corresponding to the link information on a display unit if the link information obtaining unit obtains the link information; and an access target selection unit configured to allow a user to determine whether to treat the link information corresponding to the display target displayed on the display unit by the link information display control unit as an access target. In this case, the second content access unit accesses the second contents to which the second address contained in the link information selected through the access target selection unit is assigned.

According to the information processing system configured as above, the user is able to determine whether to access the second contents viewing the display target corresponding to the link information displayed on the display unit.

In at least one aspect, the first contents contain a plurality of objects. In this case, the link information print control unit prints the link information for each of the plurality of objects in the first contents, the link information display control unit displays a plurality of display targets respectively corresponding to a plurality of pieces of link information if the plurality of pieces of link information are obtained by the link information obtaining unit, and the access target selection unit allows the user to determine whether to treat the link information as an access target for each of the plurality of pieces of link information corresponding to the plurality of display targets displayed on the display unit by the link information display control unit.

According to the information processing system configured as above, it is possible to print a plurality of pieces of link information if a plurality of objects are contained in the first contents. Since the user is able to determine whether to access the second contents for each of the plurality of pieces of link information, it is possible to access only the second contents which the user needs to access. Since the second contents not required by the user is not accessed, it is possible to prevent the point of the provider of the first contents from being incremented undesirably.

In at least one aspect, the link information contains the object in the first contents or a third address assigned to the object. In this case, the link information display unit displays the object contained in the link information or the object obtained from the third address contained in the link information as the display target corresponding to the link information.

According to the information processing system configured as above, it is possible to display the object on the display unit. Such a configuration enables the user to easily know what type of contents the object relates to and to access the second contents from the object.

In at least one aspect, the link information to be printed is represented by a code symbol.

According to another aspect of the invention, there is provided a printing device, which comprises a printing unit that executes a print operation, a first content print control unit configured to print first contents which has a first address on a network and contains an object to which a second address is assigned as a link target address through the printing unit, a link information forming unit configured such that when the first contents are printed through the printing unit, the link information forming unit forms link information containing information indicating that the first address is a link source address and the second address is the link target address, and a link information print control unit configured to print the link information formed by the link information forming unit in such a print style that accessing to second contents of the second address and notifying the access target of information on the first address as the link source address can be recognized by reading the link information through a reading device.

According to the printing device configured as above, it is possible to form the link information when the first contents are printed and to print the link information. By reading the link information through a reading unit described as above, it is possible to easily access the second contents of the link target and to notify the provider of the second contents of information on the link source address.

According to another aspect of the invention, there is provided a content access system, which comprises a reading unit configured to be capable of reading an image from an original, a link information obtaining unit configured to obtain link information from an image read by the reading unit from a printing medium on which the link information is printed, a second content access unit configured to access second contents to which a second address of a link target contained in the link information is assigned in accordance with the link information obtained by the link information obtaining unit, and a link source address notification unit configured to notify the link target of information on a first address contained in the link information as a link source address in response to execution of access by the second content access unit.

According to the content access system configured as above, by reading printed the link information, it is possible to easily access the second contents of the link target and to notify the provider of the second contents of information on the link source address.

In at least one aspect, the content access system further comprises a link information display control unit configured to display a display target corresponding to the link information on a display unit if the link information obtaining unit obtains the link information; and an access target selection unit configured to allow a user to determine whether to treat the link information corresponding to the display target displayed on the display unit by the link information display control unit as an access target. In this case, the second content access unit accesses the second contents to which the second address contained in the link information selected through the access target selection unit is assigned.

According to another aspect of the invention, there is provided a computer readable medium having computer readable instructions stored thereon, which, when executed by a computer, are configured to cause a printing unit to print link information containing information indicating that a first address is a link source address and a second address is a link target address, when first contents which has the first address on a network and contains an object to which the second address is assigned as the link target address are printed through the printing unit, to obtain the link information printed by the printing unit, to access second contents to which the second address contained in the link information is assigned in accordance with the obtained link information, and to notify the link target address of information on the first address contained in the link information as the link source address in response to execution of access to the second contents.

According to the computer readable medium configured as above, it is possible to configure the above mentioned information processing system.

According to another aspect of the invention, there is provided a computer readable medium having computer readable instructions stored thereon, which, when executed by a computer, are configured to print first contents which has a first address on a network and contains an object to which a second address is assigned as a link target address through the printing unit, to form link information containing information indicating that the first address is a link source address and the second address is the link target address when the first contents are printed through the printing unit, and to print the link information in such a print style that accessing to second contents of the second address and notifying the access target of information on the first address as the link source address can be recognized by reading the link information through a reading device.

According to the computer readable medium configured as above, it is possible to configure the above mentioned printing device.

According to another aspect of the invention, there is provided a computer readable medium having computer readable instructions stored thereon, which, when executed by a computer, are configured to obtain link information from an image read by a reading unit from a printing medium on which the link information is printed, to access second contents to which a second address of a link target contained in the link information is assigned in accordance with the obtained link information, and to notify the link target of information on a first address contained in the link information as a link source address in response to execution of access to the second contents.

According to the computer readable medium configured as above, it is possible to configure the above mentioned content access system.

EMBODIMENT

Hereafter, an embodiment according to the invention will be described with reference to the accompanying drawings.

Figure 1:
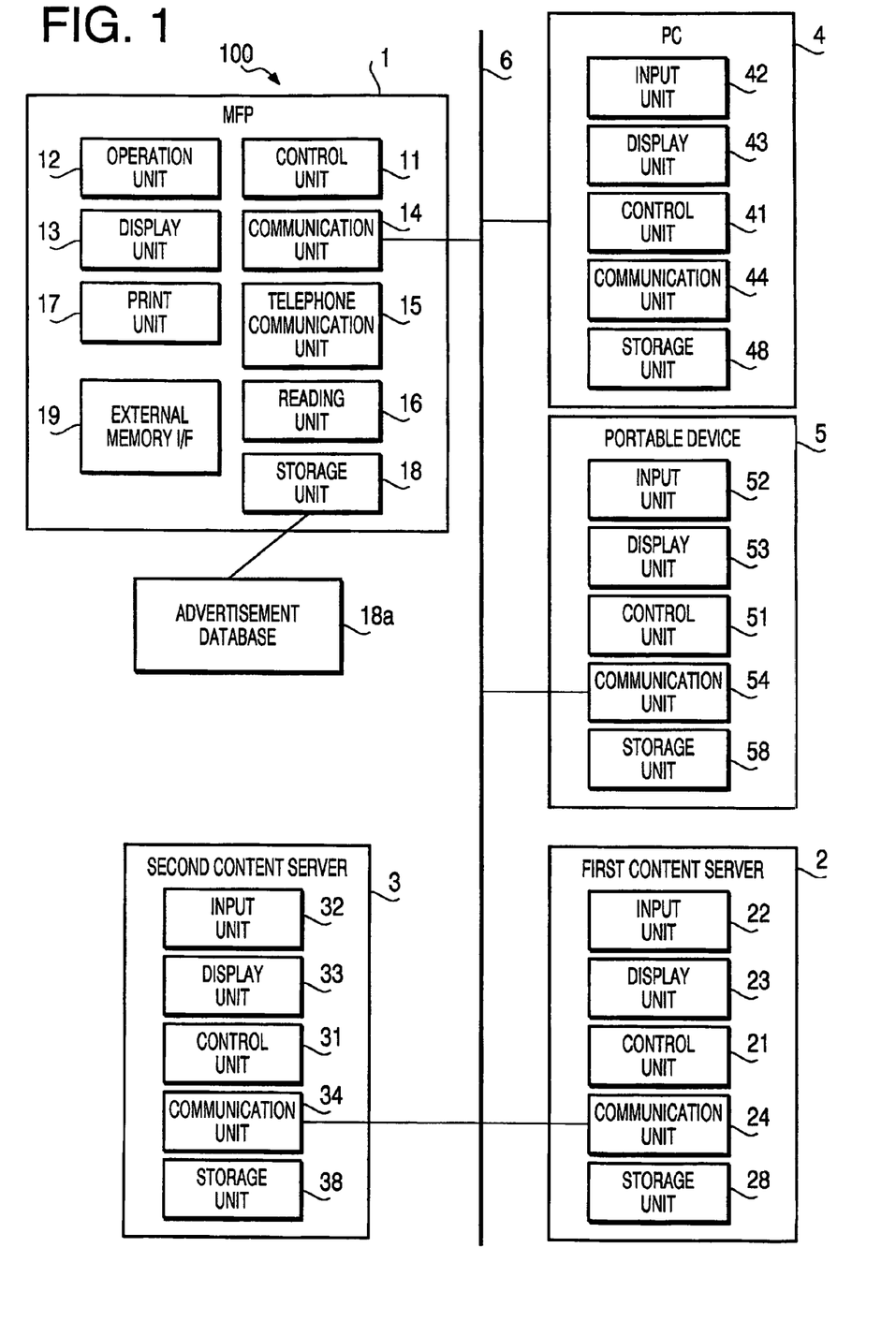
FIG. 1 is a block diagram of a network system according to an embodiment of the invention.

FIG. 1 is a block diagram of a network system 100 according to an embodiment of the invention. The network system 100 includes a MFP (multifunction peripheral) 1, a first content server 2, a second content server 3, a PC (personal computer) 4, and a portable device 5, which are connected to each other via a network 6.

The MFP 1 has multiple functions of a telephone (voice communication) function, a scanner function, a print function, a copy function, and a facsimile function. The PC 4 is able to cause the MFP 1 to print out contents which the PC 4 obtains from the first content server 2 by transmitting the contents obtained from the first content server 2 to the MFP 1. Hereafter, contents obtained from the first content server 2 is referred to as contents #1, and contents obtained form the second content server 3 is referred to as contents #2. The MFP 1 is also able to access the first or second content server in accordance with a user operation to obtain contents #1 or #2 from the first or second content server, and to print out the contents #1 or #2.

It should be noted that the first and second servers 2 and 3 are illustrated in FIG. 1 as representative servers on the network 6. More than two content server may be provided on the network 6. As described later, in contents #1 provided by the first content server 2, an object (e.g., a banner advertisement) containing a link to contents #2 is included.

Each of the PC 4 and the portable device 5 has a browser capable of browsing contents distributed by the first content server 2 or the second content server 3, and is able to instruct the MFP 1 to print out the obtained (browsed) contents by transmitting the obtained contents to the MFP 1. The network 6 is, for example, a combined network of a local area network and a wide area network, and includes relaying devices (e.g., a router or a gateway).

As shown in FIG. 1, the MFP 1 includes a control unit 11, an operation unit 12, a display unit 13, a communication unit 14, a telephone communication unit 15, a reading unit 16, a print unit 17, a storage unit 18, and an external memory interface 19. The control unit 11 includes a CPU, a ROM and a RAM, and the CPU executes processes in accordance with programs stored in the ROM so that the control unit 11 attains the functions of the MFP 1. In the control unit 11, a part of the programs is stored in a rewritable ROM (e.g., a flash memory). The MFP 1 is configured to update the program stored in the rewritable ROM by reading a program from an external device via the communication unit 14 or from an external memory via the external memory interface 19.

The operation unit 12 is formed of an operation panel (not shown) including keys to be operated by a user. More specifically, the operation panel includes function key for activating the primary functions, a one touch key (enabling the user to execute a function which typically requires some user operation steps to execute the function by simply pressing the one touch key), direction keys (to be operated by moving a focus in a display area on the display unit 13, an OK key for confirming a user input, and a cancel key for canceling an input.

The display unit 13 includes a LCD panel having the size capable of displaying an object (e.g., a banner advertisement) in contents #1 in its original size or a scale-down size. The communication unit 14 is, for example, a NIC (Network Interface Card) interfacing the MFP 1 with the network 6. The telephone communication unit 15 is formed of, for example, a modem controlling telephone communication via a public network (not shown). The MFP 1 includes also a handset, a speaker, and an amplifier.

The reading unit 16 is configured to read an original set on an ADF (Automatic Document Feeder) or placed on a contacting glass of an flat bed, band to generate image data of a read image. The reading unit 16 is activated when a reading operation by the scanner function or a reading operation for facsimile image transmission is performed. The print unit 17 is configured to print an image corresponding to image data on a sheet like recording medium. The print unit 17 is activated when a print operation by the print function or a print operation for printing a received image by the facsimile function is performed.

Figure 2:
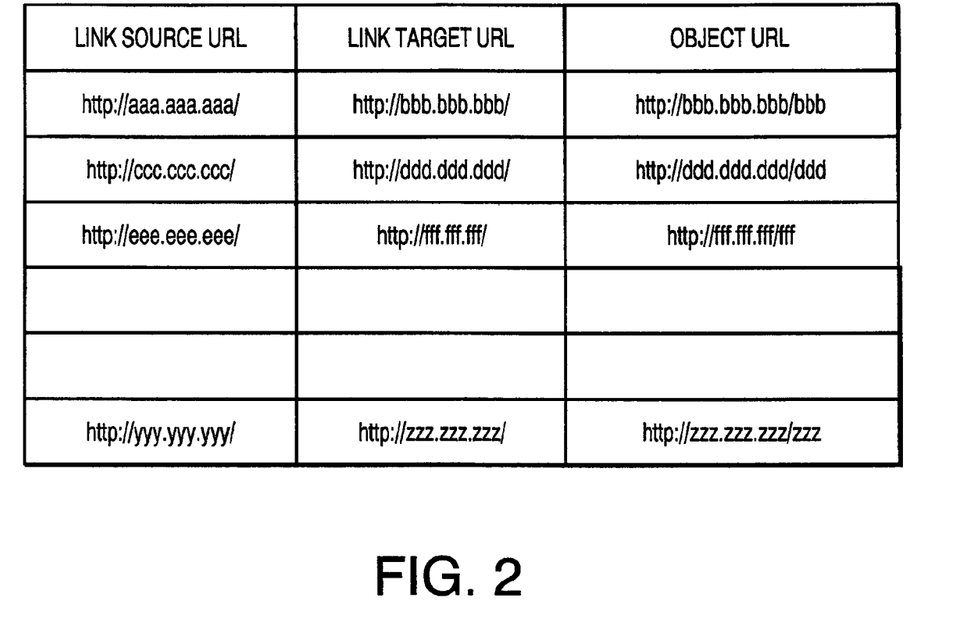
FIG. 2 illustrates an example of a data structure of an advertisement database.

The storage unit 18 is, for example, an HDD in which various types of information for the functions of the MFP 1 is stored. In the storage unit 18, an advertisement database 18a is formed. In the advertisement database 18a, link information obtained from contents is stored each time the MFP 1 print out the contents. FIG. 2 illustrates an example of a data structure of the advertisement database 18a. As shown in FIG. 2, the advertisement database 18a includes a link source URL, a link target URL and an URL of an object (hereafter, referred to as an object URL). These three data items constitute a piece of link information. The advertisement database stores one or more pieces of link information. The link source URL represents an address of contents to be printed, the link target URL represents an address of a link target assigned to an object contained in the contents to be printed, and the object URL represents an address of the object contained in the contents to be printed.

The external memory interface 19 is an interface for accessing a memory card attached to a memory card slot of the MFP 1.

The first content server 2 includes a control unit 21, an input unit 22, a display unit 23, a communication unit 24, and a storage unit 25. The control unit 21 includes a CPU, a ROM and a RAM. The CPU executes server software under control of an OS (Operating System) by loading software of the OS and the server software in the RAM so that internal components of the first content server 2 can be controlled, and executes processes in response to a request from a client (e.g., the MFP 1, the PC 4 or the portable device 5). The processes to be executed in response to a request from a client include distributing a web page stored in the storage unit 28 to a requesting source via the communication unit 24, and dynamically generating a web page based on information stored in the storage unit 28 and distributing the generated web page to a requesting source via the communication unit 24. The contents distributed as above are the contents #1. In the contents #1, an object (e.g., a banner advertisement) to which a link to contents #2 is assigned is included.

The input unit 22 and the display unit 23 constitute a user interface of the first content server 2 to be operated by an administrator of the first content server 2. Specifically, the input unit 22 includes a keyboard and a mouse to be operated by a user. The display unit 23 includes a LCD panel. The communication unit 24 is, for example, a NIC (Network Interface Card) configured to interface the first content server 2 with the network 6. The storage unit 28 is, for example, an HDD. In the storage unit 28, web pages to be distributed as contents #1 and information used to dynamically generating contents #1 are stored.

The second content server 3 includes a control unit 31, an input unit 32, a display unit 33, a communication unit 34, and a storage unit 35. The control unit 31 includes a CPU, a ROM and a RAM. The CPU executes server software under control of an OS (Operating System) by loading software of the OS and the server software in the RAM so that internal components of the second content server 3 can be controlled, and executes processes in response to a request from a client (e.g., the MFP 1, the PC 4 or the portable device 5). The processes to be executed in response to a request from a client include distributing a web page stored in the storage unit 38 to a requesting source via the communication unit 34, and dynamically generating a web page based on information stored in the storage unit 38 and distributing the generated web page to a requesting source via the communication unit 34. The contents distributed as above are the contents #3.

The input unit 32 and the display unit 33 constitute a user interface of the second content server 3 to be operated by an administrator of the second content server 3. Specifically, the input unit 32 includes a keyboard and a mouse to be operated by a user. The display unit 33 includes a LCD panel. The communication unit 34 is, for example, a NIC (Network Interface Card) configured to interface the second content server 3 with the network 6. The storage unit 38 is, for example, an HDD. In the storage unit 38, web pages to be distributed as contents #2 and information used to dynamically generating contents #2 are stored.

Hereafter, a configuration of the PC 4 is explained. As shown in FIG. 1, the PC 4 includes a control unit 41, an input unit 42, a display unit 43, a communication unit 44, a storage unit 45. The control unit 41 includes a CPU, a ROM and a RAM. In the ROM, a BIOS (Basic Input Output System) and basic settings are stored. Programs such as an OS (Operating System) and an application are read from the storage unit 45 and are loaded in the RAM. The CPU executes the programs stored in the Rom or the RAM to control functions of the PC 4.

The input unit 42 includes a keyboard and a pointing device (e.g., a mouse) to be operated by a user. The communication unit 42 is, for example, an NIC (Network Interface Card) which interfaces the PC 4 with the network 6. The storage unit 45 is, for example, an HDD storing the OS, application programs and various types of data files.

The portable device 5 includes a control unit 51, an input unit 52, a display unit 53, a communication unit 54, a storage unit 55. The control unit 51 includes a CPU, a ROM and a RAM. In the ROM, a BIOS (Basic Input Output System) and basic settings are stored. Programs such as an OS (Operating System) and an application are read from the storage unit 55 and are loaded in the RAM. The CPU executes the programs stored in the Rom or the RAM to control functions of the portable device 5.

The input unit 52 includes a keyboard and a pointing device (e.g., a mouse) to be operated by a user. The communication unit 52 is, for example, a wireless LAN card which interfaces the portable device 5 with an access point of a wireless LAN. The storage unit 45 is, for example, an HDD storing the OS, application programs and various types of data files.

Hereafter, a multifunction process to be executed under control of the control unit 11 of the MFP 1 to which the function as an information processing system is implemented is explained with reference to FIG. 3. First, the control unit 11 accepts an input of a command (step S105). In step S105, the user is able to input a command to the MFP 1 by operating keys of the operation unit 12. Alternatively, in step S105, the control unit 11 receives a command issued by the PC 4 or the portable device 5 through the network 6.

After accepting the command input in step S105, the control unit 11 judges whether a process to be executed is an input process (step S110). If a process to be executed is an input process (S100: YES), the control unit 11 judges whether the command is to be inputted through a panel provided in the operation unit 12 (step S115).

If the command is to be inputted through the panel provided in the operation unit 12 (S115: YES), the control unit 11 executes a panel input process which is explained in detail later (step S120). After the panel input process is finished, control returns to step S105. If the command is not to be inputted through the panel provided in the operation unit 12 (S115: NO), the control unit 11 judges whether the command is to be inputted from a scanner provided in the reading unit 16 (step S125). If the command is to be inputted by the scanner of the reading unit 16 (S125: YES), the control unit 11 executes a reading process which is explained in detail later (step S130). After the reading process is finished, control returns to step S105. If the command is not to be inputted by the scanner of the reading unit 16 (S125: NO), control returns to step S105.

If a process to be executed is not an input process (S100: NO), control proceeds to step S135 where the control unit 11 judges whether a process to be executed is an output process. If a process to be executed is an output process (S135: YES), control proceeds to step S140 where the control unit 11 judges whether the control unit 11 judges whether a process to be executed is only an output process. If a process to be executed is only an output process (S140: YES), the control unit 11 executes a print process for adding a link target which is explained in detail later (step S145). After the print process for adding a link target is finished, control returns to step S105.

If a process to be executed is not only an output process (S140: NO), the control unit 11 judges whether the output process is accompanied by panel representation (step S150). If the output process is accompanied by panel representation (S150: YES), the control unit 11 executes a print and panel representation process which is explained in detail later (step S155). After the print and panel representation process is finished, control returns to step S105.

If the output process is not accompanied by panel representation (S150: NO), control returns to step S105. If a process to be executed is not an output process (S135: NO), the control unit 11 executes another process (step S160). After step S160 is finished, control returns to step S105.

Figure 4:
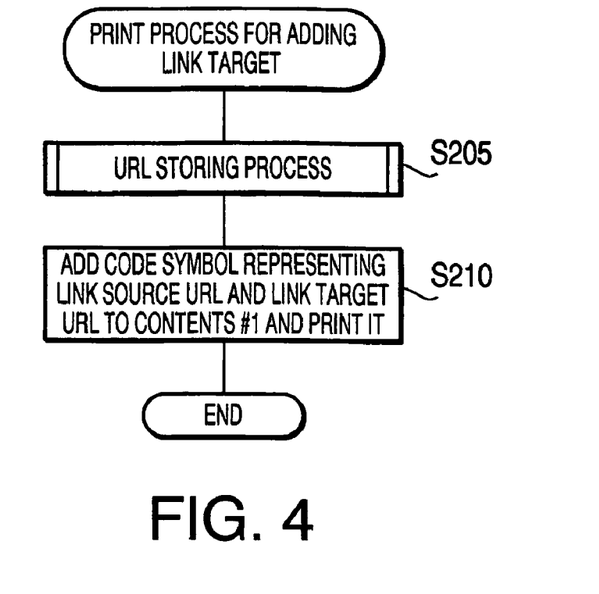
FIG. 4 is a flowchart illustrating a printing process for adding a link target executed by the multifunction peripheral.
Figure 5:
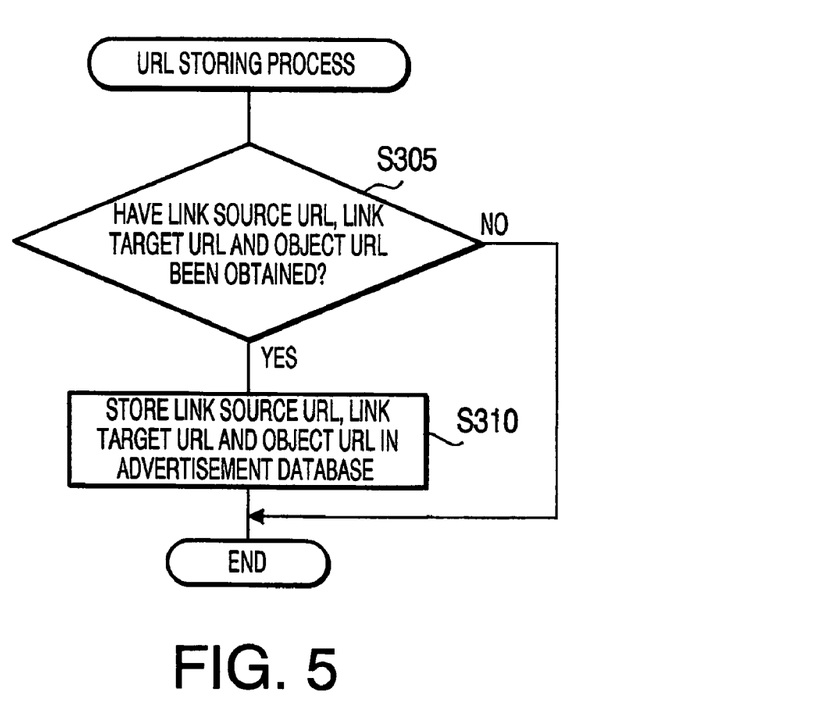
FIG. 5 is a flowchart illustrating a URL storing process executed by the multifunction peripheral.

Hereafter, the printing process for adding a link target (step S145 in FIG. 3) to be executed by the MFP 1 is explained with reference to FIGS. 4 and 5. The printing process for adding a link target is executed to print contents #1 (e.g., a web page) obtained from the first content server 2 on a recording medium while adding the ink information to the contents #1, and to store the ink information in the advertisement database 18a. The contents #1 to be printed may be obtained by the MFP 1 or may be obtained by the PC 4 or the portable device 5 which transmits the obtained contents #1 to the MFP 1. In the contents #1, an image (i.e., an object) called a banner advertisement is contained, and an address of contents #2 (an advertisement web page) is assigned to the object as a link target address.

When the printing process for adding a link target is started, the control unit 11 executes a URL storing process (step S205). FIG. 5 is a flowchart illustrating the URL storing process. As shown in FIG. 5, the control unit 11 judges whether a link source URL, a link target URL and an object URL are obtained (step S305). If the contents #1 contains an object to which a link target address is assigned, the link source address tested in step S305 is an address of the contents #1, the link target address tested in step S305 is the address of a link target assigned to the object, and the object URL is an address of the contents #1. The judgment in step S305 is executed according to whether these addresses are obtained.

If the link source URL, the link target URL and the object URL are obtained (S305: YES), the control unit 11 stores the link source URL, the link target URL and the object URL in the advertisement database 18a (step S310). Then, the URL storing process terminates. If the link source URL, the link target URL and the object URL not obtained (S305: NO), the URL storing process terminates.

After thus finishing the URL storing process (i.e., S205 in FIG. 4), control proceeds to step S210 where the control unit 11 adds a code symbol containing the link source URL and the link target URL to the contents #1 and prints the contents #1. Then, the printing process for adding a link target terminates.

Figure 6A:
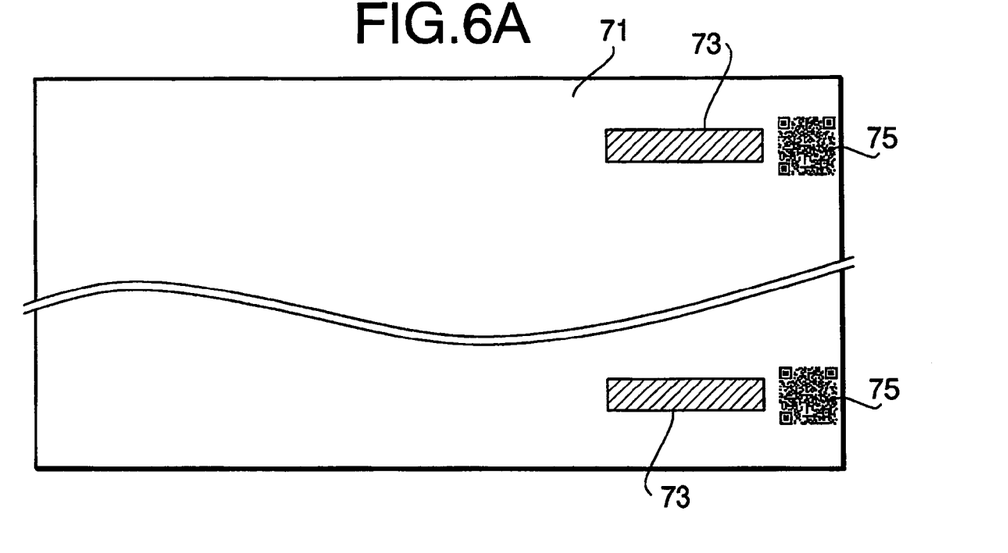
FIG. 6A illustrates an example of a printing medium on which code symbols are printed.

By executing the printing process for adding a link target, a printing medium such as a printing medium 71 shown in FIG. 6A is printed out from the printing unit 71 of the MFP 1. On the printing medium 71, the contents #1 obtaining an object 73 and a code symbol 75 corresponding to the object 73 are printed. The code symbol 75 is, for example, a two-dimensional code such as a QR Code®. On the printing medium 71, the code symbol 75 is located alongside the object 73.

To the object 73, a link address is assigned. The object 73 is, for example, text or an image. The contents #1 may contain an object to which a link target address is not assigned. The code symbol 75 is not added to such an object (not assigned a link target address). In FIG. 6A, only an object to which a code symbol is added is illustrated, and an object to which a code symbol is not added is not illustrated.

In the reading process (which is explained in detail later), link information (i.e., a link target URL (an address of contents #2) and a link source address (an address of the contents #1)) corresponding each object, and the object URL (an address of the object 73) are read.

Figure 6B:
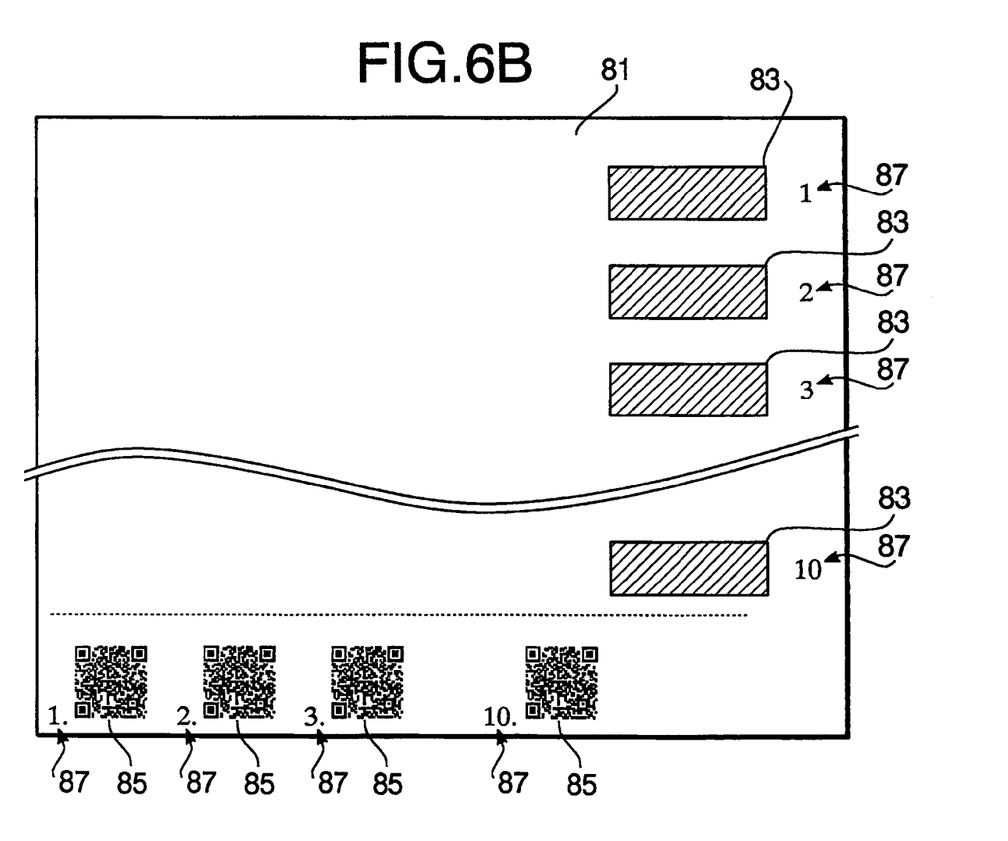
FIG. 6B illustrates another example of a printing medium on which code symbols are printed.

In the printing medium 71 shown in FIG. 6A, the code symbol 75 is arranged alongside the object 73. However, the code symbol may be located at another position. FIG. 6B shows another example of a printing medium 81 on which objects 83 and code symbols 85 are arranged such that the code symbols 85 are located in a region different from a region in which the contents #1 is printed. In the example of FIG. 6B, the code symbols 85 are arranged in a lump in a region lower than the region in which the contents #1 are printed.

If the code symbol 75 is arranged alongside the object 73 as shown in FIG. 6A, the user is able to easily recognize a relationship between the code symbol and the object. On the other hand, if the code symbols are located in a region different from the region in which the contents #1 printed as shown in FIG. 6B, it is possible to enable the user to securely recognize all of the code symbols in comparison with a case where code symbols are scattered over the entire region on the contents #1. The printing process for adding a link target may be configured such that the user is able to determine where the code symbols are printed.

To enable the user to recognize the relationship between the code symbol and the object more easily, the same reference number (87) may be assigned to the object and the corresponding code symbol as shown in FIG. 6B.

Figure 3:
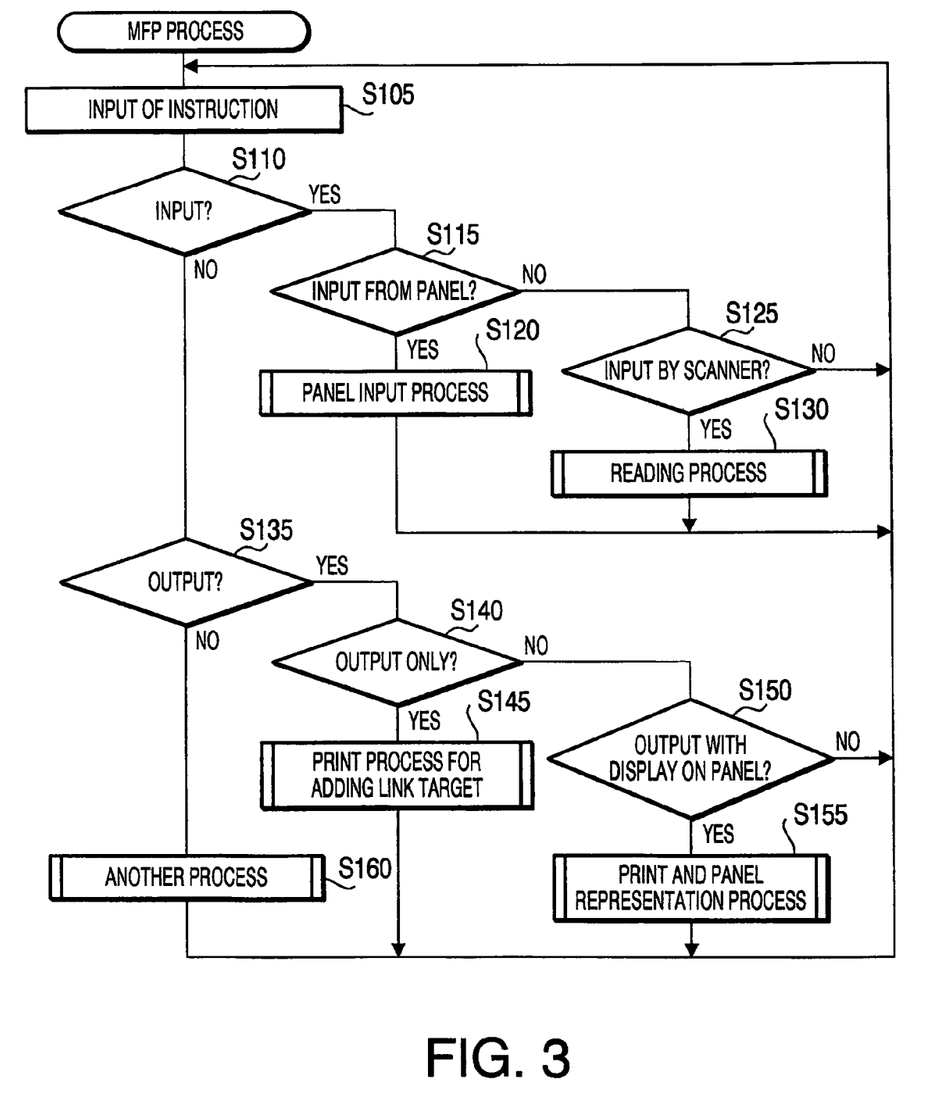
FIG. 3 is a flowchart illustrating a multifunction process executed by a multifunction peripheral provided in the network system.
Figure 7:
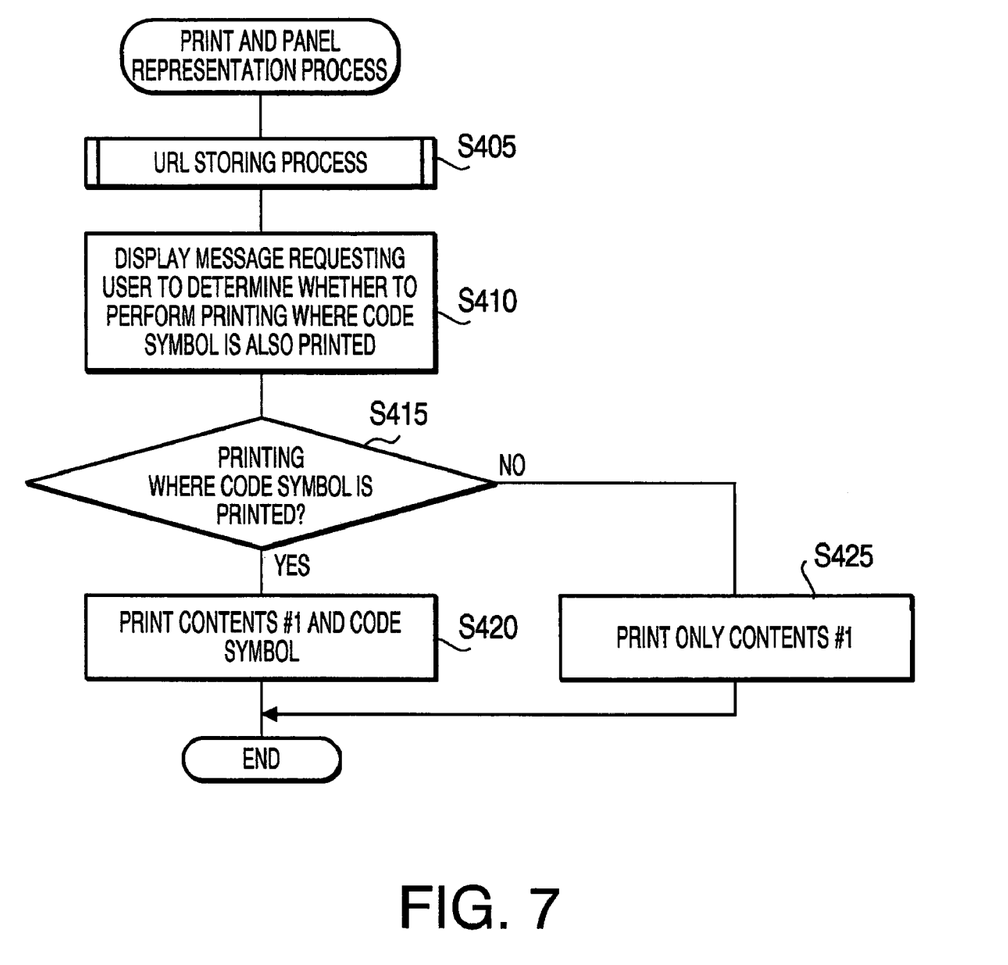
FIG. 7 is a flowchart illustrating a print and panel representation process executed by the multifunction peripheral.

Hereafter, the print and panel representation process executed in step S145 of FIG. 3 is explained with reference to FIG. 7. The print and panel representation process is executed by the MFP 1. The print and panel representation process is executed to print contents #1 (e.g., a web page) obtained from the first content server 2 on a recording medium and to store the link information in the advertisement database 18a. In the print and panel representation process, the user is allowed to determine whether to add link information to the contents #1 and then to print the contents #1.

When the print and panel representation process is started, the URL storing process which the same as the URL storing process shown in Fig. is executed (step S405). After the URL storing process is finished, the control unit 11 displays a message requesting the user to determine whether to perform the printing in which a code symbol is also printed (step S410). The message is displayed on the display unit 13 so that the user is able to determine whether to perform the printing in which a code symbol is also printed, through the operation unit 12. After user selection is conducted in step S410, control proceeds to step S415.

In step S415, the control unit 11 judge whether the user selected to perform the printing in which a code symbol is also printed (step S415). If the user selected to perform the printing in which a code symbol is also printed (S415: YES), the control unit 11 prints code symbols when the contents #1 are printed (step S420). Then, the print and panel representation process terminates.

If the user selected not to perform the printing in which a code symbol is also printed (S415: NO), the control unit 11 prints only the contents #1 and does not print the code symbol (step S425). Then, the print and panel representation process terminates.

By selecting to print the contents while adding the code symbol in the print and panel representation process, the printing medium 71 or 81 shown in FIG. 6A or 6B can be obtained from the print unit 17 of the MFP 1.

Figure 8:
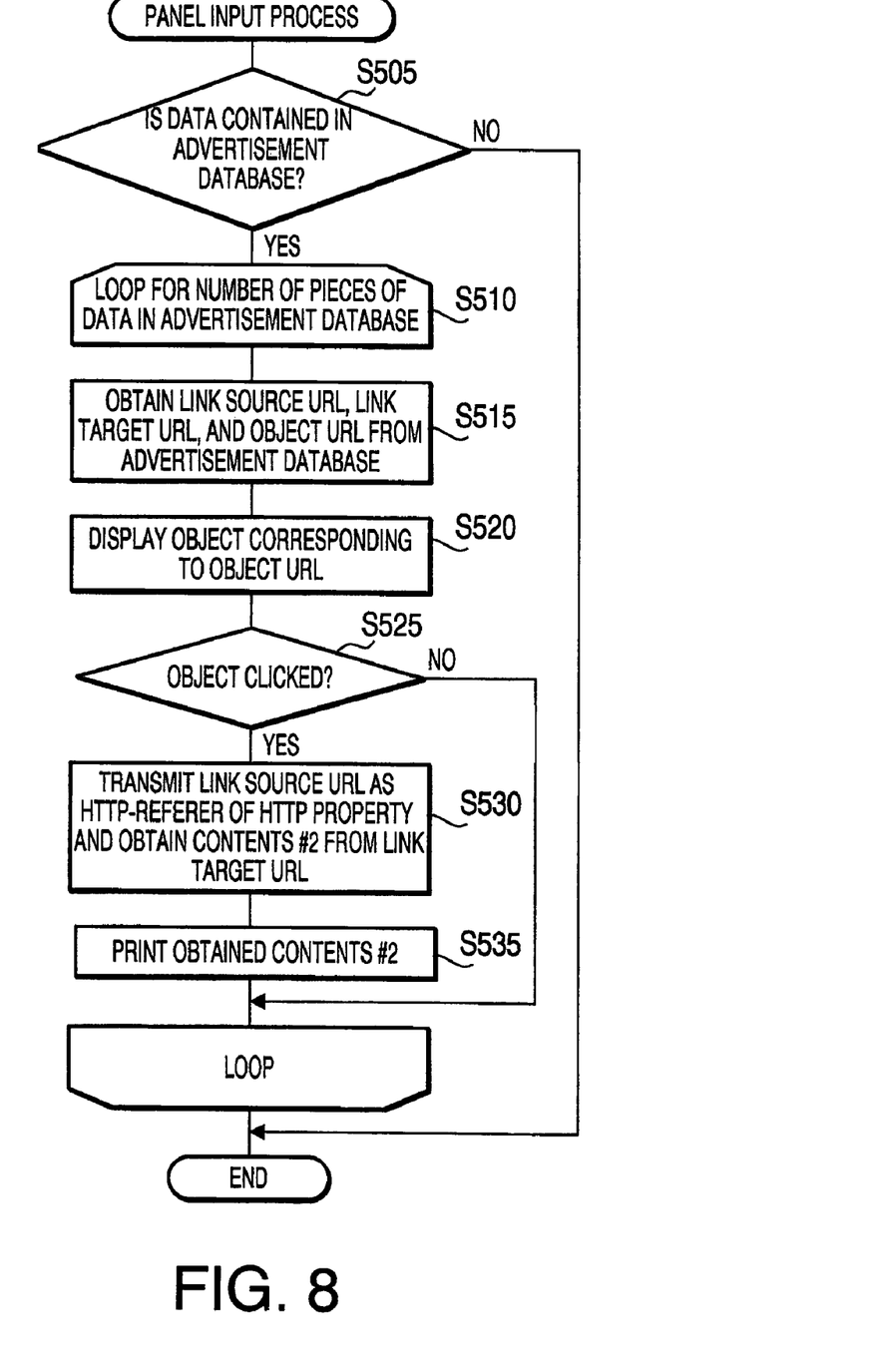
FIG. 8 is a flowchart illustrating a panel input process executed by the multifunction peripheral.

Hereafter, the panel input process executed in step S120 of FIG. 3 by the MFP 1 is explained with reference to FIG. 8. The panel input process is executed to access the second content server 3 in accordance with the link information stored in the advertisement database 18a in the print process for adding a link target and the print and panel representation process (see step S310).

When the panel input process is started, the control unit 11 judges whether a target (link information) is contained in the advertisement database 18a (step S505). If a target is contained in the advertisement database 18a (S505: YES), the control unit 11 executes a loop process a number of times corresponding to the number of targets in the advertisement database 18a (step S510).

In one loop, the control unit 11 obtains a link source URL, a link target URL and an object URL from the advertisement database 18a (step S515). Then, the control unit 11 displays an object corresponding to the object URL on the display unit 13 (step S520). In step S520, the control unit 11 obtains the object from the second content server 3 in accordance with the obtained object URL and displays the object on the display unit 13. The object thus displayed is equal to the object stored in the content #1 as the banner advertisement.

After the object is displayed in step S520, the control unit 11 judges whether the object displayed on the display unit 13 is clicked by the user through the operation unit 12 (step S525). If the object displayed on the display unit 13 is clicked (S525: YES), the control unit 11 notifies the link target of the link source URL as an HTTP-referer (which is a property of an HTTP) and obtains the contents #2 of the link target URL (step S530). Since the link source URL is an address of the contents #1 containing the object to which the link target URL is assigned, a request equal to a request which is issued when the object contained in the contents #1 is clicked is transmitted to the second content server 3 in step S530.

The second content server 3 which received the request recognizes that the request for browsing the contents #2 is issued by the user (i.e., a person who browsed the contents #1) by clicking the object in the contents #1, and transmits the contents #2 to the request source (the MFP 1). The MFP 1 thus obtains the contents #2.

After obtaining the contents #2, the control unit 11 print the obtained contents #2 (step S535). If the object displayed on the display unit 13 is not clicked (S525: NO), steps S530 and S535 are skipped.

After the above mentioned loop has been repeated the number of times corresponding to the number of targets in the advertisement database 18a, the panel input process terminates.

If a target is not contained in the advertisement database 18a (S505: NO), steps S510 to S535 are skipped, and the panel input process terminates.

Figure 9:
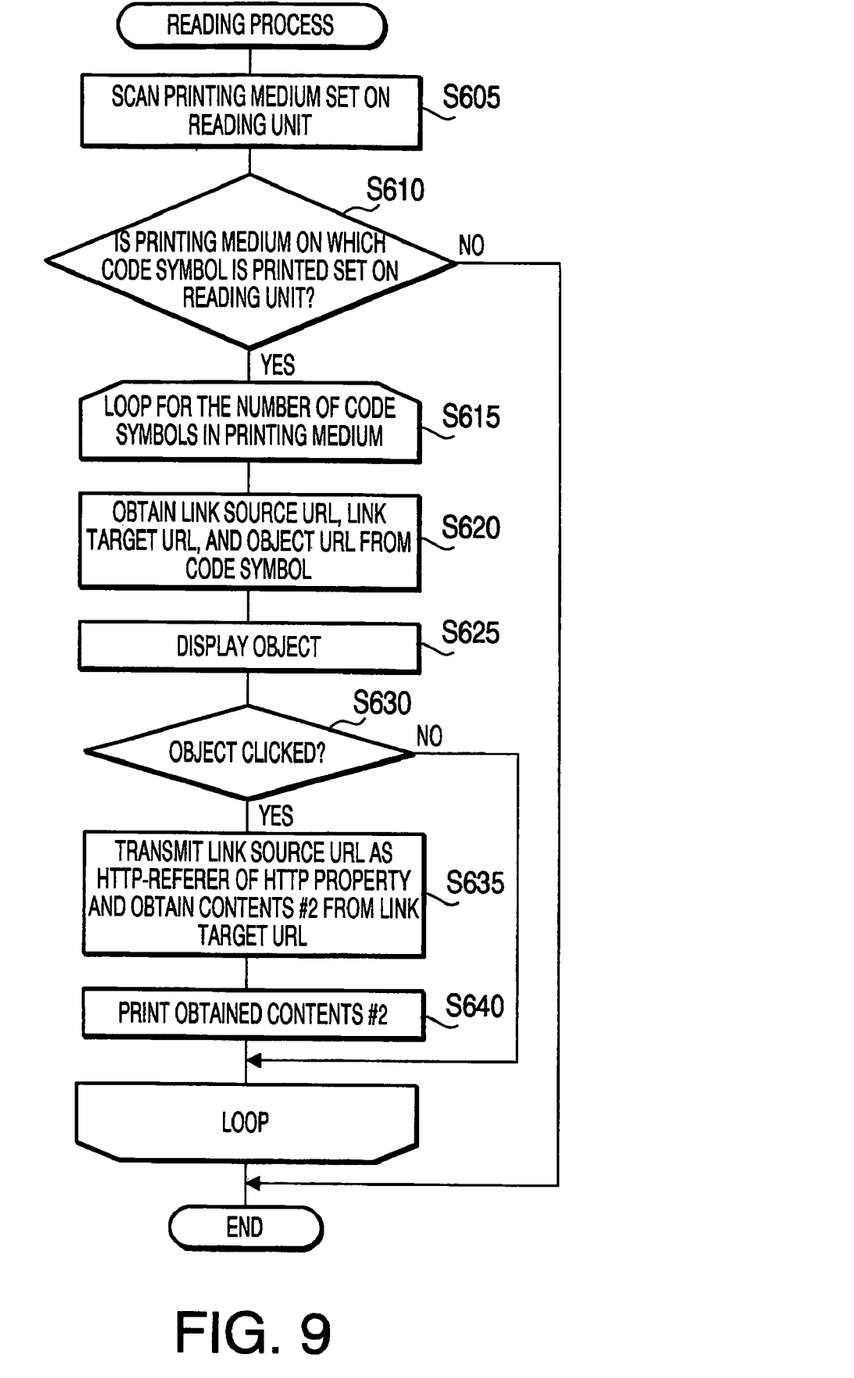
FIG. 9 is a flowchart illustrating a reading process executed by the multifunction peripheral.

Hereafter, the reading process executed by the MFP 1 in step S130 of FIG. 3 is explained with reference to FIG. 9. The reading process is executed to access the second content server 3 in accordance with the link information printed as the code symbol in the print process for adding a link target and the print and panel representation process (see S210 and S420).

When the reading process is started, the control unit 11 cause the reading unit 16 to scan the printing medium set on the reading unit 16 (step S605). Then, the control unit 11 judges whether the reading medium on which a target (link information) is printed is set on the reading unit 16 (step S610). In step S610, the control unit 11 judges that the reading medium on which a target (link information) is printed is set on the reading unit 16 if it is judged that an image having a property of a code symbol (e.g., a two-dimensional code such as a QR Code®) is contained in the printing medium by performing image processing on the scanned image.

If the reading medium on which a target (link information) is printed is set on the reading unit 16 (S610: YES), the control unit 11 executes a loop process a number of times corresponding to the number of targets in the printing medium (step S615).

In one loop, the control unit 11 obtains a link source URL, a link target URL and an object URL from the target code symbol (step S620). Then, the control unit 11 displays an object corresponding to the object URL on the display unit 13 (step S625). In step S625, the control unit 11 obtains the object from the second content server 3 in accordance with the obtained object URL and displays the object on the display unit 13. The object thus displayed is equal to the object stored in the content #1 as the banner advertisement.

After the object is displayed in step S625, the control unit 11 judges whether the object displayed on the display unit 13 is clicked by the user through the operation unit 12 (step S630). If the object displayed on the display unit 13 is clicked (S630: YES), the control unit 11 notifies the link target of the link source URL as an HTTP-referer (which is a property of an HTTP) and obtains the contents #2 of the link target URL (step S635). Since the link source URL is an address of the contents #1 containing the object to which the link target URL is assigned, a request equal to a request which is issued when the object contained in the contents #1 is clicked is transmitted to the second content server 3 in step S635.

The second content server 3 which received the request recognizes that the request for browsing the contents #2 is issued by the user (i.e., a person who browsed the contents #1) by clicking the object in the contents #1, and transmits the contents #2 to the request source (the MFP 1). The MFP 1 thus obtains the contents #2.

After obtaining the contents #2, the control unit 11 print the obtained contents #2 (step S640). If the object displayed on the display unit 13 is not clicked (S630: NO), steps S635 and S640 are skipped.

After the above mentioned loop has been repeated the number of times corresponding to the number of targets in the printing medium, the panel input process terminates.

If the reading medium on which a target (link information) is printed is not set on the reading unit 16 (S610: NO), steps S615 to S640 are skipped, and the reading process terminates.

As described above, according to the embodiment, if the contents #1 containing the object to which a link to the contents #2 is assigned is printed, link information representing an link source address and a link target address is printed as a code symbol (e.g., a two-dimensional code such as a QR Code®). Therefore, by reading the link information through the reading unit 16, it is possible to easily access the contents #2 to which the link target address is assigned and to notify the link target of information on the link source address.

For example, it is possible to click a banner advertisement on contents #1 and to print contents #2 of a link target on the MFP 1. In this case, if a provider of the contents #1 has participated in an affiliate system in which a point is added when a banner advertisement in the contents #1 is clicked, the fact that the link source is the contents #1 is notified to the provider of the contents #2. Therefore, it is possible to increment the point corresponding to the provider of the contents #1.

The MFP 1 stores the link information in the advertisement database 18a if the contents #1 containing the object to which a link to the contents #2 is assigned is printed. Therefore, with regard to the link information stored in the advertisement database 18a, it is possible to easily access the contents #2 without reading the link information from the printing medium, and to notify the provider of the contents #2 of the information on the link source address.

According to the embodiment, the user is able to determine whether to print the link information (see step S410 and S415). Therefore, the user who wants to print the link information is able to instruct the MFP 1 to print the link information. On the other hand, the user who does not want to print the link information is able to instruct the MFP 1 not to print the link information.

According to the embodiment, the MFP 1 enables the user to click the object corresponding to the link information to determine whether to access the link target while displaying the object on the display unit 13 (see steps S520 to S535 and S625 to S640). Therefore, the user is able to determine whether to access the contents #2. Since these steps are repeated in the loop process (see S510 and S615), the user is able to determine whether to access the content #2 for each of the plurality of pieces of link information.

The MFP 1 stores the object URL as part of the link information, and displays the object obtained in accordance with the object URL on the display unit 13 so that the user is able to determine whether to print the contents #2 of the link target while viewing the displayed object URL. Such a configuration enables the user to easily know what type of contents the displayed object relates to. Consequently, the user is able to determine whether to print the contents #2 easily and effectively.

Although the present invention has been described in considerable detail with reference to certain preferred embodiments thereof, other embodiments are possible.

In the above mentioned embodiment, a two-dimensional code is used as a code symbol representing the link information so that the code symbol is readable by the reading unit 16. However, a one-dimensional bar code symbol may be used as the code symbol. Although in the above mentioned embodiment a QR Code® is used as the two-dimensional code symbol, a different type of a two-dimensional code may be used in place of a QR Code®.

In the above mentioned embodiment, the control unit 11, the reading unit 16 and the print unit 17 are integrated into the MFP 1 formed as an information processing system. However, a printing device functioning as the print unit 17 and a reading device functioning as the reading unit 16 may be provided in the network system 100 as standalone devices. In this case, a microcomputer ship is each of the printing device and the reading device functions to achieve the functions described in the above mentioned embodiment. Each of the printing device and the reading device may be provided with a communication interface so that the printing device and the scanner are able to communicate with each other.

It is possible to from the above mentioned information processing system by using the printing device, the reading device and a personal computer. In the case, the personal computer serves to execute the functions of the information processing system. A part of the functions of the information processing system may be treated by the microcomputer chip provided in each of the printing device and the reading device.

In this case, each of the printing device, the reading device and the personal computer may be provided with a communication interface so that the printing device, the reading device and the personal computer are communicate with each other.

In the above mentioned embodiment, the information processing system is implemented in the MFP 1 having the telephone (voice communication) function, the scanner function, the print function, the copy function, and the facsimile function. However, since a standalone printing device may be used as a part of the information processing system, the standalone printing device may be formed as a device having at least a print function, such as a copying device or a facsimile device. A standalone reading device may be formed as a device having at least a scanner function, such as a copying device and a facsimile device.

In the above mentioned embodiment, the object URL is store in the advertisement URL 18a, and the object is obtained in accordance with the object URL in the advertisement database 18a when the object is displayed on the display unit 13. However, data of the object may be stored in the advertisement database 18a if space of the advertisement database 18a is large enough to store data of the object. The MFP 1 may operate to store the data of the object in the advertisement database 18a if the amount of the data is smaller than a certain threshold, and to store the object URL of the object in the advertisement database 18a if the amount of the data is larger than the certain threshold. The MFP 1 may operate to allow the user to determine whether to store the object URL of the object or the data of the object.

What is claimed is:

1. An information processing system, comprising:
   a printing unit that executes a print operation;
   a link information print control unit configured such that when first contents which has a first address on a network and contains an object to which a second address is assigned as a link target address are printed through the printing unit, the link information print control unit causes the printing unit to print link information containing information indicating that the first address is a link source address and the second address is the link target address;
   a link information obtaining unit configured to obtain the link information printed by the printing unit under control of the link information print control unit;
   a second content access unit configured to access second contents to which the second address contained in the link information is assigned in accordance with the link information obtained by the link information obtaining unit;
   a link source address notification unit configured to notify the link target address of information on the first address contained in the link information as the link source address in response to execution of access by the second content access unit; and
   a reading unit configured to be capable of reading an image from an original,
   wherein the link information print control unit causes the printing unit to print the link information such that the reading unit is able to read and recognize the link information; and
   the link information obtaining unit obtains the link information from an image read by the reading unit.

2. The information processing system according to claim 1, further comprising a link information storage control unit configured to store the link information in a storage unit if an object to which the second address is assigned as the link target address is contained in the first contents at an occasion of printing the first contents to which the first address is assigned through the printing unit,
   wherein the link information obtaining unit obtains the link information stored in the storage unit.

3. The information processing system according to claim 1, further comprising a link information storage control unit configured to store the link information in a storage unit if an object to which the second address is assigned as the link target address is contained in the first contents at an occasion of printing the first contents to which the first address is assigned through the printing unit,
   wherein the link information obtaining unit obtains the link information stored in the storage unit.

4. The information processing system according to claim 1, further comprising:
   a link information display control unit configured to display a display target corresponding to the link information on a display unit if the link information obtaining unit obtains the link information; and
   an access target selection unit configured to allow a user to determine whether to treat the link information corresponding to the display target displayed on the display unit by the link information display control unit as an access target,
   wherein the second content access unit accesses the second contents to which the second address contained in the link information selected through the access target selection unit is assigned.

5. The information processing system according to claim 1, further comprising a link information print instruction input unit configured to allow a user to input an instruction indicating whether to print the link information,
   wherein the link information print control unit causes the printing unit to print the link information if the instruction to print the link information is inputted through the link information print instruction input unit.

6. The information processing system according to claim 1, further comprising:
   a link information display control unit configured to display a display target corresponding to the link information on a display unit if the link information obtaining unit obtains the link information; and
   an access target selection unit configured to allow a user to determine whether to treat the link information corresponding to the display target displayed on the display unit by the link information display control unit as an access target,
   wherein the second content access unit accesses the second contents to which the second address contained in the link information selected through the access target selection unit is assigned.

7. The information processing system according to claim 6, wherein:
   the first contents contain a plurality of objects;
   the link information print control unit prints the link information for each of the plurality of objects in the first contents;
   the link information display control unit displays a plurality of display targets respectively corresponding to a plurality of pieces of link information if the plurality of pieces of link information are obtained by the link information obtaining unit; and
   the access target selection unit allows the user to determine whether to treat the link information as an access target for each of the plurality of pieces of link information corresponding to the plurality of display targets displayed on the display unit by the link information display control unit.

8. The information processing system according to claim 6, wherein:
the link information contains the object in the first contents or a third address assigned to the object; and
the link information display unit displays the object contained in the link information or the object obtained from the third address contained in the link information as the display target corresponding to the link information.

9. The information processing device according to claim 1, wherein the link information to be printed is represented by a code symbol.

10. A printing device, comprising:
a printing unit that executes a print operation;
a first content print control unit configured to print first contents which has a first address on a network and contains an object to which a second address is assigned as a link target address through the printing unit;
a link information forming unit configured such that when the first contents are printed through the printing unit, the link information forming unit forms link information containing information indicating that the first address is a link source address and the second address is the link target address;
a link information print control unit configured to print the link information formed by the link information forming unit in such a print style that accessing to second contents of the second address and notifying the access target of information on the first address as the link source address can be recognized by reading the link information through a reading device;
a link information display control unit configured to display a display target corresponding to the link information on a display unit if the link information obtaining unit obtains the link information; and
an access target selection unit configured to allow a user to determine whether to treat the link information corresponding to the display target displayed on the display unit by the link information display control unit as an access target,
wherein a second content access unit accesses the second contents to which the second address contained in the link information selected through the access target selection unit is assigned.

11. A content access system, comprising:
a reading unit configured to be capable of reading an image from an original;
a link information obtaining unit configured to obtain link information from an image read by the reading unit from a printing medium on which the link information is printed;
a second content access unit configured to access second contents to which a second address of a link target contained in the link information is assigned in accordance with the link information obtained by the link information obtaining unit;
a link source address notification unit configured to notify the link target of information on a first address contained in the link information as a link source address in response to execution of access by the second content access unit;
a link information display control unit configured to display a display target corresponding to the link information on a display unit if the link information obtaining unit obtains the link information; and
an access target selection unit configured to allow a user to determine whether to treat the link information corresponding to the display target displayed on the display unit by the link information display control unit as an access target,
wherein the second content access unit accesses the second contents to which the second address contained in the link information selected through the access target selection unit is assigned.

12. A computer readable medium having computer readable instructions stored thereon, which, when executed by a computer, are configured to:
cause a printing unit to print link information containing information indicating that a first address is a link source address and a second address is a link target address, when first contents which has the first address on a network and contains an object to which the second address is assigned as the link target address are printed through the printing unit,
obtain the link information printed by the printing unit;
access second contents to which the second address contained in the link information is assigned in accordance with the obtained link information;
notify the link target address of information on the first address contained in the link information as the link source address in response to execution of access to the second contents;
cause the printing unit to print the link information such that a reading unit is able to read and recognize the link information; and
obtain the link information from an image read by a reading unit.

13. A computer readable medium having computer readable instructions stored thereon, which, when executed by a computer, are configured to:
print first contents which has a first address on a network and contains an object to which a second address is assigned as a link target address through the printing unit,
form link information containing information indicating that the first address is a link source address and the second address is the link target address when the first contents are printed through the printing unit;
print the link information in such a print style that accessing to second contents of the second address and notifying the access target of information on the first address as the link source address can be recognized by reading the link information through a reading device;
cause a link information display control unit to display a display target corresponding to the link information on a display unit if the link information obtaining unit obtains the link information; and
cause an access target selection unit to allow a user to determine whether to treat the link information corresponding to the display target displayed on the display unit by a link information display control unit as an access target,
wherein a second content access unit accesses the second contents to which the second address contained in the link information selected through the access target selection unit is assigned.

14. A computer readable medium having computer readable instructions stored thereon, which, when executed by a computer, are configured to:
obtain link information from an image read by a reading unit from a printing medium on which the link information is printed;

access second contents to which a second address of a link target contained in the link information is assigned in accordance with the obtained link information;

notify the link target of information on a first address contained in the link information as a link source address in response to execution of access to the second contents;

cause a link information display control unit configured to display a display target corresponding to the link information on a display unit if a link information obtaining unit obtains the link information; and cause an access target selection unit configured to allow a user to determine whether to treat the link information corresponding to the display target displayed on the display unit by the link information display control unit as an access target, wherein a second content access unit accesses the second contents to which the second address contained in the link information selected through the access target selection unit is assigned.

15. An information processing system, comprising:

a printing unit that executes a print operation;

a link information print control unit configured such that when first contents which has a first address on a network and contains an object to which a second address is assigned as a link target address are printed through the printing unit, the link information print control unit causes the printing unit to print link information containing information indicating that the first address is a link source address and the second address is the link target address;

a link information obtaining unit configured to obtain the link information printed by the printing unit under control of the link information print control unit;

a second content access unit configured to access second contents to which the second address contained in the link information is assigned in accordance with the link information obtained by the link information obtaining unit;

a link source address notification unit configured to notify the link target address of information on the first address contained in the link information as the link source address in response to execution of access by the second content access unit;

a link information display control unit configured to display a display target corresponding to the link information on a display unit if the link information obtaining unit obtains the link information; and an access target selection unit configured to allow a user to determine whether to treat the link information corresponding to the display target displayed on the display unit by the link information display control unit as an access target, wherein the second content access unit accesses the second contents to which the second address contained in the link information selected through the access target selection unit is assigned.

16. The information processing system according to claim 15, wherein:

the first contents contain a plurality of objects;

the link information print control unit prints the link information for each of the plurality of objects in the first contents;

the link information display control unit displays a plurality of display targets respectively corresponding to a plurality of pieces of link information if the plurality of pieces of link information are obtained by the link information obtaining unit; and the access target selection unit allows the user to determine whether to treat the link information as an access target for each of the plurality of pieces of link information corresponding to the plurality of display targets displayed on the display unit by the link information display control unit.

17. The information processing system according to claim 15, wherein:

the link information contains the object in the first contents or a third address assigned to the object; and the link information display unit displays the object contained in the link information or the object obtained from the third address contained in the link information as the display target corresponding to the link information.

18. A computer readable medium having computer readable instructions stored thereon, which, when executed by a computer, are configured to:

cause a printing unit to print link information containing information indicating that a first address is a link source address and a second address is a link target address, when first contents which has the first address on a network and contains an object to which the second address is assigned as the link target address are printed through the printing unit;

obtain the link information printed by the printing unit;

access second contents to which the second address contained in the link information is assigned in accordance with the obtained link information;

notify the link target address of information on the first address contained in the link information as the link source address in response to execution of access to the second contents;

cause a link information display control unit to display a display target corresponding to the link information on a display unit if a link information obtaining unit obtains the link information; and cause an access target selection unit to allow a user to determine whether to treat the link information corresponding to the display target displayed on the display unit by the link information display control unit as an access target, wherein a second content access unit accesses the second contents to which the second address contained in the link information selected through the access target selection unit is assigned.

* * * * *